(12) United States Patent
Hayasaki et al.

(10) Patent No.: US 8,503,197 B2
(45) Date of Patent: Aug. 6, 2013

(54) POWER SUPPLY APPARATUS AND IMAGE FORMING APPARATUS

(75) Inventors: Minoru Hayasaki, Mishima (JP);
Keisuke Samejima, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 395 days.

(21) Appl. No.: 12/628,037

(22) Filed: Nov. 30, 2009

(65) Prior Publication Data

US 2010/0149840 A1 Jun. 17, 2010

(30) Foreign Application Priority Data

Dec. 15, 2008 (JP) ................................. 2008-318322

(51) Int. Cl.
*H02M 3/335* (2006.01)
(52) U.S. Cl.
USPC .......................................... 363/21.16; 363/19
(58) Field of Classification Search
USPC ................. 323/271–274, 280, 266, 285–289, 323/901; 363/16–20, 22, 21.12, 56.11, 89, 363/97, 98, 49
See application file for complete search history.

(56) References Cited

U.S. PATENT DOCUMENTS

| | | | | |
|---|---|---|---|---|
| 5,455,503 A | * | 10/1995 | Kohler | 323/273 |
| 5,657,215 A | * | 8/1997 | Faulk | 363/41 |
| 5,684,685 A | * | 11/1997 | Komatsu et al. | 363/95 |
| 5,901,051 A | * | 5/1999 | Takahashi et al. | 363/21.18 |
| 6,157,549 A | * | 12/2000 | Nath | 348/730 |
| 6,160,720 A | | 12/2000 | Nishida et al. | |
| 6,285,566 B1 | * | 9/2001 | Nakahira et al. | 363/19 |
| 6,295,217 B1 | * | 9/2001 | Yang et al. | 363/49 |
| 6,430,062 B1 | * | 8/2002 | Shin | 363/21.01 |
| 6,909,618 B2 | * | 6/2005 | Murakami | 363/49 |
| 7,157,886 B2 | * | 1/2007 | Agarwal et al. | 323/207 |
| 7,408,329 B2 | * | 8/2008 | Wiedemuth et al. | 323/224 |
| 7,787,268 B2 | * | 8/2010 | Fenton et al. | 363/47 |

FOREIGN PATENT DOCUMENTS

| | | |
|---|---|---|
| JP | 2000-270544 A | 9/2000 |
| JP | 2000-278946 A | 10/2000 |
| JP | 2006-101597 A | 4/2006 |
| JP | 2008-67494 A | 3/2008 |

OTHER PUBLICATIONS

U.S. Appl. No. 12/684,078, filed Jan. 7, 2010. Applicants: Minoru Hayasaki, et al.

* cited by examiner

*Primary Examiner* — Rajnikant Patel
(74) *Attorney, Agent, or Firm* — Fitzpatrick, Cella, Harper & Scinto

(57) ABSTRACT

The power supply apparatus for obtaining a direct current from an alternating voltage source includes a first DC/DC converter for outputting a first direct current and a second DC/DC converter for a second direct current lower than the first direct current from the first DC/DC converter, and the output voltage of the first DC/DC converter is changed to a lower direct current and the second DC/DC converter is driven in a continuously-conducting state.

15 Claims, 10 Drawing Sheets

POWER SUPPLY APPARATUS AND IMAGE FORMING APPARATUS

BACKGROUND OF THE INVENTION

1. Field of the Invention

The present invention relates to a power supply of an apparatus that has a normal operating mode and a standby mode in which energy is saved.

2. Description of Related Art

FIG. 13 illustrates an arrangement of a power supply apparatus for obtaining a conventionally known regulated DC power supply.

An appliance on which the power supply apparatus is mounted is arranged to supply two levels of voltage: a first direct current for a driving section that includes, for example, a motor and a solenoid and requires a relatively high voltage to operate, and a second direct current for a control section that requires a low voltage to operate a CPU, an ASIC and the like.

In addition, since the driving section is not operated in the standby mode, i.e. when the apparatus is in the energy-saving state, a load in the driving section need not be supplied with voltage. The apparatus, therefore, is arranged to block the voltage supplied to the load in the driving section by means of a load switch (not illustrated) or the like in the standby mode. In FIG. 13, a first DC/DC converter A supplies a power supply voltage for the driving section and a second DC/DC converter B supplies a power supply voltage for the control section.

With reference to FIG. 13, detailed description will now be made. The components illustrated in FIG. 13 are arranged as described below.

The apparatus includes a commercial alternating voltage source 700, a rectifier 702, a smoothing capacitor 703, a start-up resistor 705, a switching element 707, a power supply control IC 710, a transformer 711, a diode 712 and a capacitor 713. The apparatus further includes a secondary rectifying diode 720, a secondary smoothing capacitor 721, resistors 722, 723 and 724, and a shunt regulator 750. The apparatus further includes an LED-side photocoupler 714-b, a capacitor 728, and an FET 732 serving as switching means for the DC/DC converter that generates the second direct current from the first direct current. The apparatus further includes a gate resistor 734, FET drive transistors 733 and 735, a control IC 738 for controlling the second DC/DC converter, an inductor 739, a diode 740, a capacitor 741 and resistors 742 and 743. The apparatus further includes a load 731 (in the driving section) for the first direct current, and a CPU 746 (in the control section) serving as a load for the second direct current.

First, the operation of the first DC/DC converter apparatus is described below.

When an alternating current is applied from the commercial alternating voltage source 700, the capacitor 703 is charged with a voltage rectified by the rectifier 702. The rectifier 702 and the capacitor 703 function as a rectification smoothing circuit for rectifying and smoothing the alternating current from the alternating voltage source. As the voltage across the capacitor 703 increases, power is supplied to the power supply control IC 710 through the start-up resistor 705, and the power supply control IC 710 then turns on the FET 707. Once the FET 707 is turned on, a current flows through a primary winding Np of the transformer 711, and a voltage applied to the Np winding of the transformer 711 causes a voltage to appear on windings Ns and Nb. The voltage appearing on the winding Nb is blocked by the diode 712 to prevent a current from flowing, and the voltage on the winding Ns is similarly blocked by the diode 720 to prevent a current from flowing. The FET 707 is turned off after a predetermined period defined by an internal circuit of the power supply control IC 710. This causes the voltage to increase on the winding Np on the drain side of the FET 707. A current flows through the winding Ns via the diode 720 in the direction so as to charge the capacitor 721; as the capacitor 721 is charged, the voltage across the capacitor 721 increases. After a predetermined period defined by the internal circuit of the power supply control IC 710, the FET 707 is turned on and a current is again supplied to the transformer 711 from the capacitor 703. When the power supply control IC 710 turns off the FET 707 after a predetermined period, the capacitor 721 is again charged through the diode 720 with the voltage on the winding Ns. The voltage across the capacitor 721 is divided by the resistors 723 and 724, and a voltage across the resistor 724 is applied to a control terminal of the shunt regulator 750. A cathode current of the shunt regulator 750 is sent the power supply control IC 710 through the photocoupler 714-b.

A reference voltage in the shunt regulator 750 is compared to the voltage across the resistor 724 divided by the resistors 723 and 724, and if the voltage across the resistor 724 is higher than the reference voltage, the apparatus operates to reduce ON width or ON duty of the FET 707 so as to reduce the output voltage. If the voltage across the resistor 724 is lower than the reference voltage in the shunt regulator 750, the apparatus performs a feedback operation such that the ON time or ON duty of the FET 707 is increased so as to increase the output voltage.

Next, the operation of the second DC/DC converter apparatus is described below.

The second DC/DC converter generates the second direct current from the output voltage of the first DC/DC converter. In the normal mode, the second DC/DC converter control IC 738 intermittently drives the FET 732 through the transistors 733 and 735, and the resistor 734. The resistors 742 and 743 divide the output voltage of the second DC/DC converter, and a voltage across the resistor 743 is input to the second DC/DC converter control IC 738. The second DC/DC converter control IC 738 has an internal reference voltage Vref2, and controls ON duty of the FET 732 such that the voltage across the resistor 743 is equal to the Vref2 to generate the stabilized second direct current. In this way, the apparatus is provided with the load switch on the output side, where the power supply voltage of the driving section is output, in order to reduce power in the standby mode, and is arranged to turn off the load switch in the standby mode by means of a control circuit, such as a CPU and an ASIC, operated through a control section power supply.

With the arrangement illustrated in FIG. 13, however, it is inevitable that, as the load is reduced, the efficiency of the DC/DC converter is also reduced. To solve the problem of the reduced efficiency, for example, Japanese Patent Application Laid-Open No. 2000-278946 discloses an arrangement that, in an RCC-type switching power supply apparatus, drops the output voltage in the standby mode and supplies to the load the output voltage raised to a desired value by a subsequent DC/DC converter. In the arrangement of Japanese Patent Application Laid-Open No. 2000-278946, the output voltage is reduced in an RCC-type converter apparatus to reduce a ringing voltage on an auxiliary winding below a threshold of a switching element while the switching element is turned off. In this way, a flyback voltage is prevented from turning on the switching element and OFF time of the main switching element is extended to reduce the oscillation frequency. As a result, a switching loss is reduced and circuit efficiency is improved.

While the appliance is in the standby mode, however, a load current in the control section is also reduced. Accordingly, the efficiency of the second DC/DC converter described above is also reduced in the standby mode of the appliance. In the arrangement of Japanese Patent Application Laid-Open No. 2000-278946, although improvement of the reduced efficiency of the first DC/DC converter due to the reduced load current is addressed, improvement of the reduced efficiency of the second DC/DC converter is not addressed.

SUMMARY OF THE INVENTION

The present invention has been made in view of the above problems, and is capable of improving efficiency of a power supply apparatus and an image forming apparatus in a standby mode in which energy is saved.

A power supply apparatus according to the present invention is a power supply apparatus for obtaining a direct current from an alternating voltage source, including: a rectification smoothing unit electrically connected to the alternating voltage source for rectifying and smoothing the alternating current; a first DC/DC converter for converting the direct current from the rectification smoothing unit and outputting a first direct current; a second DC/DC converter, receiving the first direct current from the first DC/DC converter, for outputting a second direct current lower than the first direct current through switching operation of a switching unit; and a transit unit for making a transit to a state in which an output voltage of the first DC/DC converter decreases from the first direct current to a third direct current lower than the second direct current and the switching unit of the second DC/DC converter is driven in a continuously-conducting state.

An image forming apparatus according to the present invention includes: a driving part driven to form an image; a control part for controlling operation of the driving part; and a power supply part for obtaining a direct current from an alternating voltage source to operate the driving part and the control part, the power supply part including: a rectification smoothing unit electrically connected to the alternating voltage source for rectifying and smoothing the alternating current; a first DC/DC converter for converting the direct current from the rectification smoothing unit and outputting a first direct current to the driving part; a second DC/DC converter, receiving the first direct current from the first DC/DC converter, for outputting to the control part a second direct current lower than the first direct current through switching operation of a switching unit; and a transit unit for making a transit to a state in which an output voltage of the first DC/DC converter decreases from the first direct current to a third direct current lower than the second direct current and the switching unit of the second DC/DC converter is driven in a continuously-conducting state, when the image forming apparatus is brought into an energy-saving mode in response to a command from the control part.

Further features of the present invention will be apparent from the detailed description below and drawings.

DESCRIPTION OF THE EMBODIMENTS

Arrangements and operation of the present invention is described below. A fundamental arrangement and the operation are described before specific examples are described. Examples illustrated below are for illustrative purpose only and is not intended to limit the technical scope of the invention thereto.

First, a power supply apparatus of Example 1 is described.

The power supply apparatus of Example 1 is based on an arrangement that is controlled—and that uses a control IC—such that switching frequency decreases in a first DC/DC converter in the standby mode (i.e. in a low-load state) as in a burst mode type or OFF-time control drive type.

Figure 1:
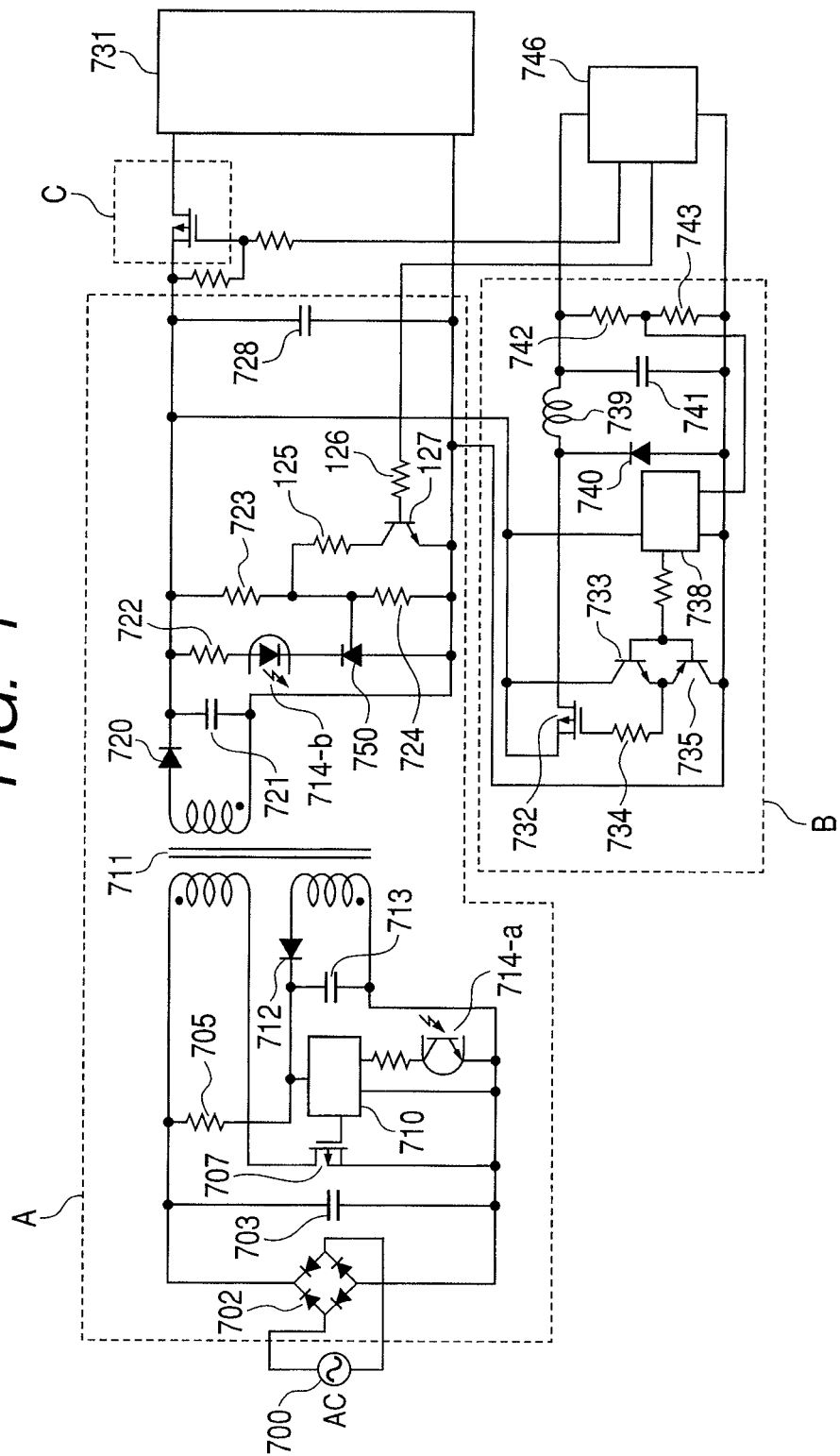
FIG. 1 is a circuit diagram illustrating an arrangement of a power supply apparatus of Example 1.

FIG. 1 is a circuit diagram of the power supply apparatus of Example 1. In FIG. 1, like reference characters are used to show duplicate parts in the arrangement of the prior art example described above. The description is omitted of duplicate portions in the prior art example, such as the operation of the rectification smoothing circuit for rectifying and smoothing the alternating current from the alternating voltage source, the operation of the first DC/DC converter and the second DC/DC converter for converting voltage, and anything similar to the prior art example. Here, a first DC/DC converter A supplies a power supply voltage for the driving section and a second DC/DC converter B supplies a power supply voltage for the control section. The apparatus includes a load switch C.

In FIG. 1, the apparatus includes resistors 125 and 126, and a transistor 127. Depending on a state of an appliance on which it is mounted, the power supply apparatus accommodates two states: a normal mode and a standby mode, and is capable of switching between these two states.

A CPU 746, which is a load of the second DC/DC converter, controls the states of the appliance and the operation of the power supply apparatus in an operating mode, i.e. the normal mode or the standby mode. To bring the power supply apparatus into the normal mode, the CPU 746 turns on the transistor 127, and turns off the transistor 127 to bring it into the standby mode. Here, the normal mode refers to the state where a direct current is supplied to a load 731 of the driving section, and the standby mode refers to the state where a direct current is not supplied to the load 731 of the driving section.

(1) Description of the Operation of the Power Supply Apparatus in the Normal Mode In the normal mode, when the CPU 746 turns on the transistor 127, a resistor 724 and the resistor 125 are electrically connected in parallel between a control terminal and the anode of a shunt regulator 750. The shunt regulator 750 causes a current to flow between the cathode and the anode so that the voltage between the control terminal and the anode is adjusted to a predetermined reference voltage value. The output voltage Vout of the first DC/DC converter, therefore, controls the FET 707 such that a resultant voltage divided by a resistor 723 and a resistor between the control terminal and the anode matches the reference voltage value Vref. The output voltage Vout is given by the following equation:

$$Vout=[(resistor\ 723+R)/R]\times Vref$$

where R is a resistance value resulting from the resistor 724 and the resistor 125 electrically connected in parallel, which is given by the following equation:

$$R=resistor\ 724\times resistor\ 125/(resistor\ 724+resistor\ 125).$$

(2) Description of the Operation of the Power Supply Apparatus in the Standby Mode In the standby mode in which energy is saved, the CPU 746 turns off the transistor 127. Once the transistor 127 is turned off, only the resistor 724 constitutes the resistance between the control terminal and the anode of the shunt regulator 750. As described above, since the shunt regulator 750 operates to adjust the voltage between the control terminal and the anode to a predetermined reference voltage value, the shunt regulator 750 operates such that:

$$Vout3=[(resistor\ 723+resistor\ 724)/resistor\ 724]\times Vref.$$

The output voltage decreases because the resistance between the control terminal and the anode of the shunt regulator in this mode increases beyond that in the normal mode.

The second DC/DC converter, as described above, generates the second direct current from the output voltage of the first DC/DC converter. As the output voltage of the first DC/DC converter decreases in the standby operation, the second DC/DC converter operates to increase ON time (or increase ON duty) of the FET 732 so as to continuously maintain the output voltage to the second direct current. Once the output voltage of the first DC/DC converter decreases below a second power supply voltage, the FET 232 of the second DC/DC converter is held in the ON state (i.e. in the state of 100% ON duty). The voltage of the first DC/DC converter continues to decrease to a third direct current. Therefore, the second DC/DC converter is placed in a continuously-conducting state, and the output voltage of the first DC/DC converter settles on a lower direct current (third direct current).

When the third direct current is Vout3 and the second direct current is Vout2, the relation is given by: Vout2>Vout3.

Therefore, the relation between the resistors 742, 743 and Vref2 and the resistors 723, 724 and Vref is given by:

$$[(resistor\ 742+resistor\ 743)/resistor\ 743]\times Vref2 > [(resistor\ 723+resistor\ 724)/resistor\ 724]\times Vref.$$

Figure 3:
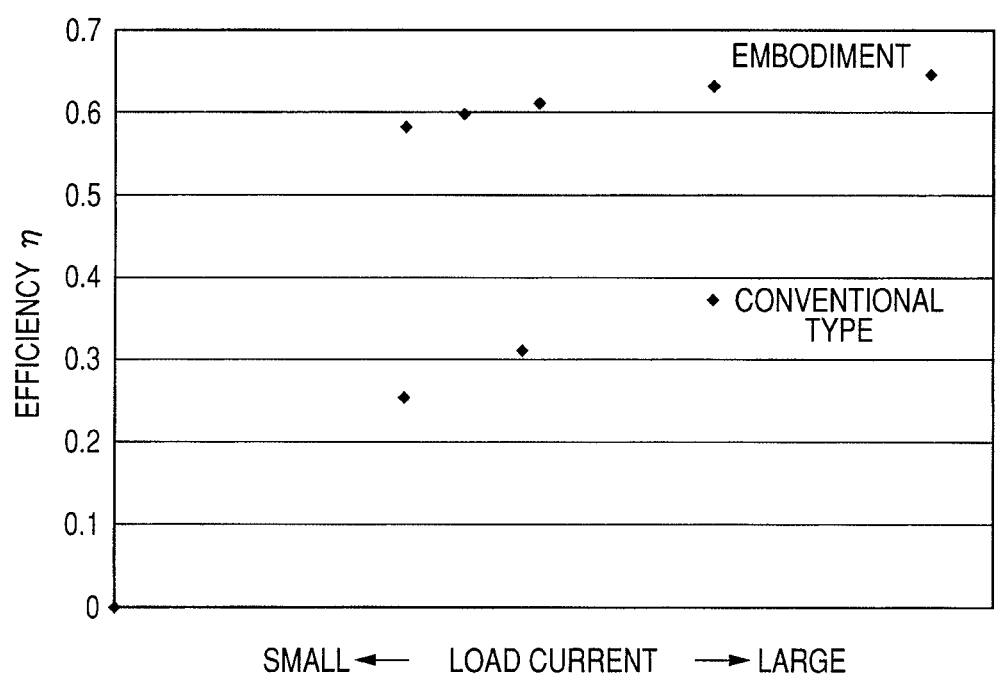
FIG. 3 is a graphical representation that makes a comparison between the efficiency of power supply of Example 1 and that of a prior art example.
Figure 13:
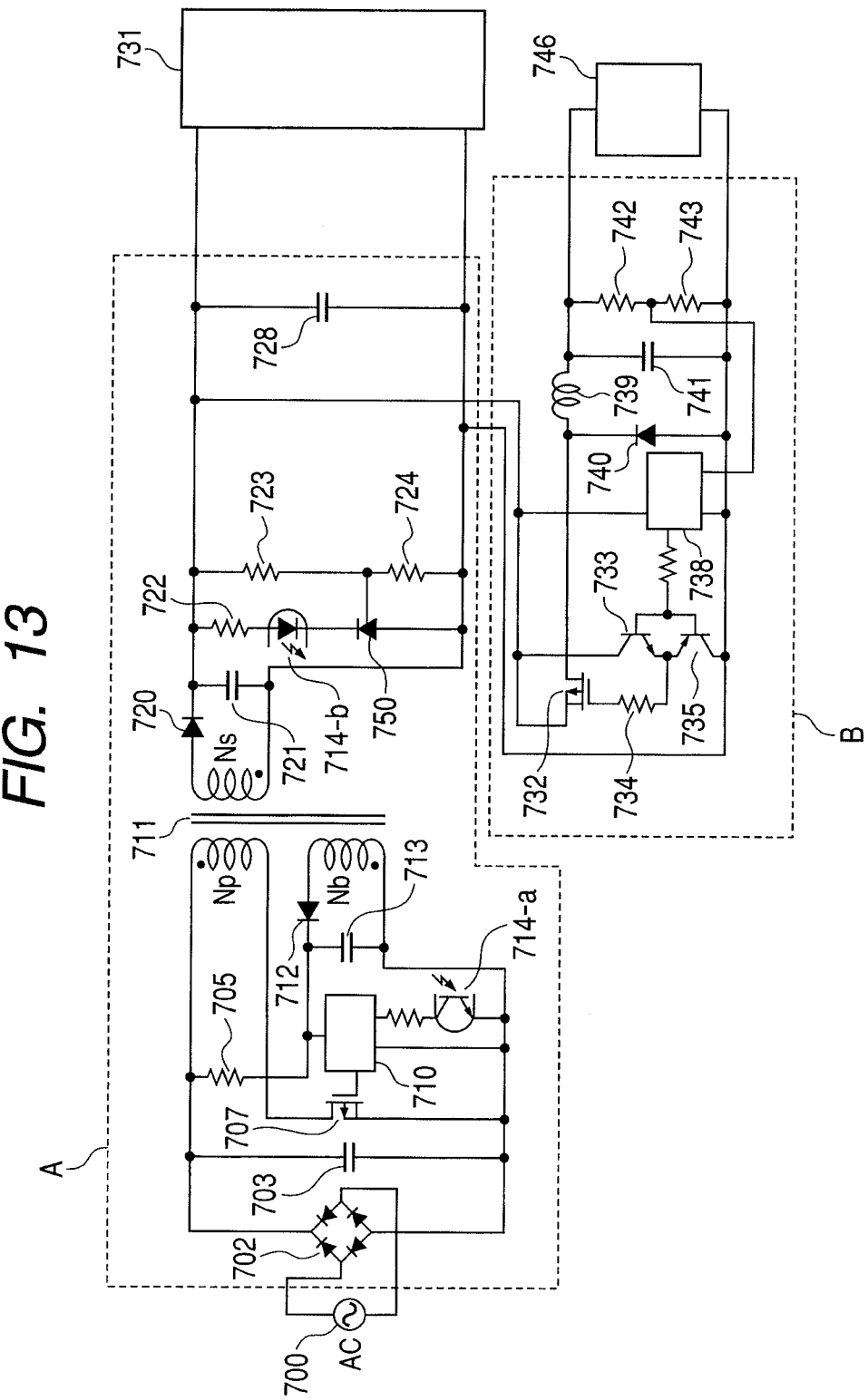
FIG. 13 is a circuit diagram illustrating an arrangement of a prior art example.

FIG. 3 illustrates a graphical representation that makes a comparison between the efficiency of power supply arranged as described above and that of a prior art arrangement (FIG. 13). In FIG. 3, the axis of abscissas represents load currents and the axis of ordinates represents the efficiency in a low-load state. This illustrates the respective efficiency relative to the load currents in Example 1 and the prior art arrangement. In the prior art arrangement, the efficiency is not good because, as the efficiency of the first DC/DC converter decreases, that of the second DC/DC converter also decreases. According to Example 1, the efficiency is improved because the loss in the second DC/DC converter is limited only to ON resistance of the FET 732.

Alternatively, if the withstanding voltage of the shunt regulator is insufficient through the shunt regulator-based control, the shunt regulator may be used as a reference voltage source and an operational amplifier (a differential amplifier) may be used to form a control circuit. Furthermore, although the voltage in the shunt regulator is used as the reference voltage, a Zener diode may be used to provide the reference voltage.

(3) Description of the Operation During a Transit Between the Modes

Next, a transit from the standby mode to the normal mode, as well as a transit from the normal mode to the standby mode is described below.

Figure 4:
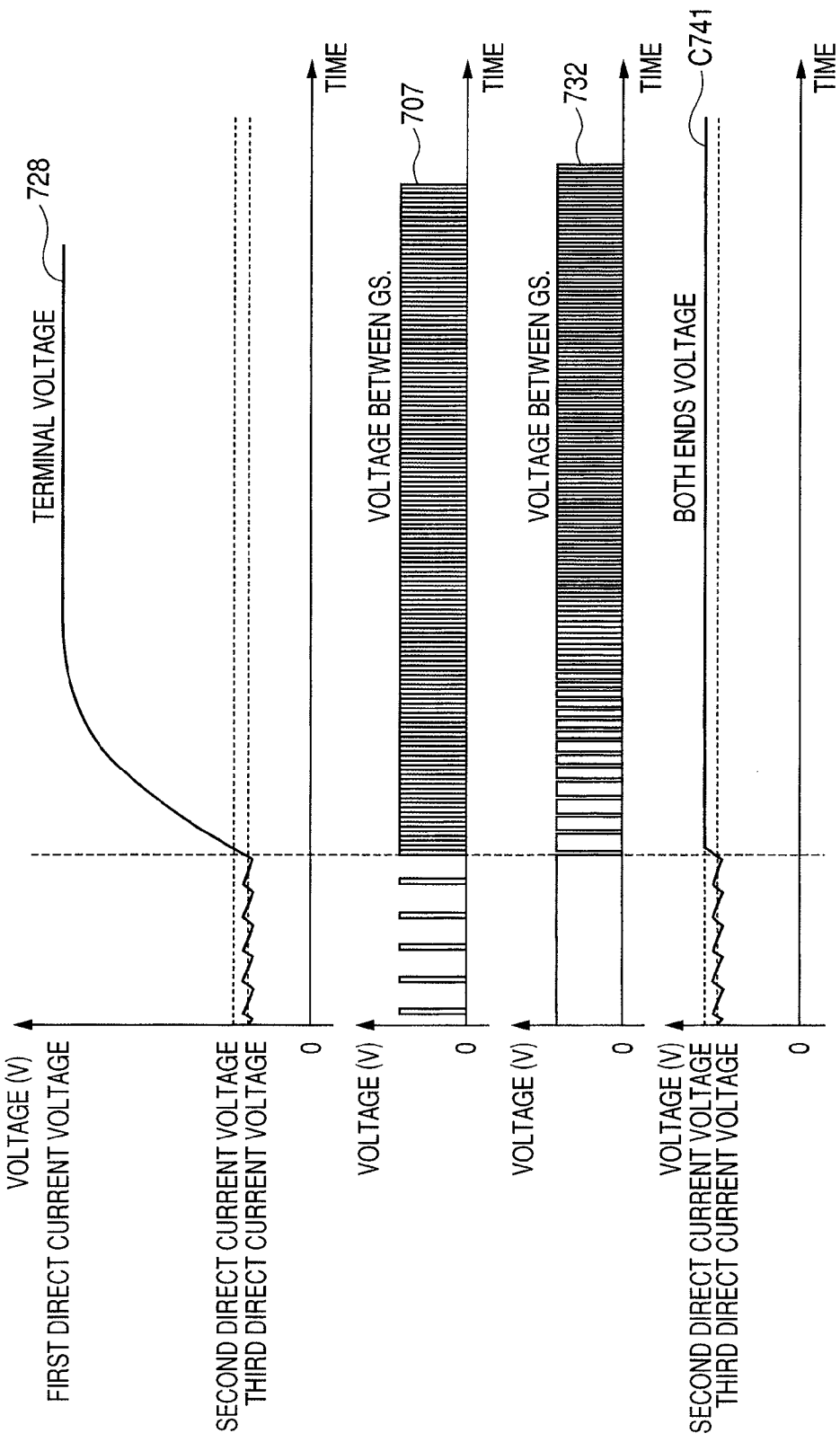
FIG. 4 is a graphical representation illustrating waveforms of the respective parts of the power supply apparatus of Example 1 when it is brought from the standby mode to the normal mode.

FIG. 4 illustrates voltages of the respective parts when a transit is made from the standby mode to the normal mode. As illustrated in FIG. 4, during a transit from the standby mode to the normal mode, the both-ends voltage of the capacitor (C) 741, i.e. the output voltage of the second DC/DC converter, changes smoothly from the third direct current to the second direct current. This is because, when the output voltage of the first DC/DC converter increases above the second direct current during a transit from the standby mode to the normal mode, the second DC/DC converter operates to control the output voltage. As can be seen, the both-ends voltage of the capacitor 741 changes from the third direct current to the second direct current, while the FETs 707 and 732 operate such that the both-ends voltage of the capacitor 728 changes smoothly to the first direct current.

Figure 5:
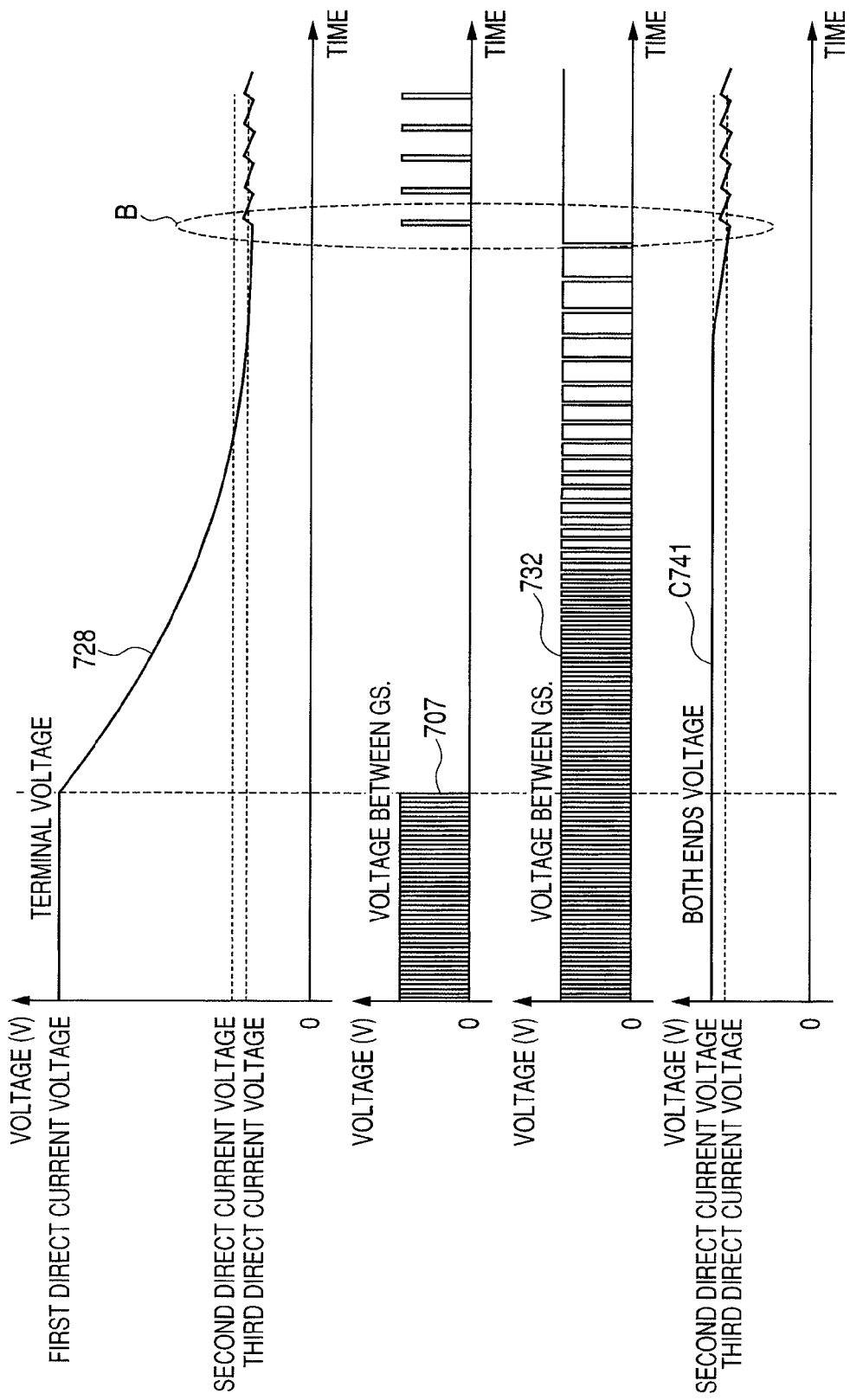
FIG. 5 is a graphical representation illustrating waveforms of the respective parts of the power supply apparatus of Example 1 when it is brought from the normal mode to the standby mode.

Next, FIG. 5 illustrates a state when a transit is made from the normal mode to the standby mode.

FIG. 5 illustrates the output voltage of the first DC/DC converter, gate voltages of the FET 707 of the first DC/DC converter and the FET 732 of the second DC/DC converter, and the output voltage of the second DC/DC converter during a transit from the normal mode to the standby mode.

As the output voltage of the first DC/DC converter decrease, the gate-source voltage of the FET 707 is turned off and the FET 707 is inactivated. Since the load current flows out even though the FET 707 of the first DC/DC converter is inactive, the output voltage of the first DC/DC converter decreases. Accordingly, the input voltage of the second DC/DC converter decreases; the second DC/DC converter then operates to increase the ON width (ON duty) of the gate of the FET 732 while the output voltage of the second DC/DC converter is maintained continuously. Once the input voltage of the second DC/DC converter decrease below the second direct current, the FET 732 of the second DC/DC converter is kept in the ON state (FET 732 gate-source voltage in FIG. 5).

Upon the output voltage of the first DC/DC converter reaching the third direct current, the FET 707 of the first DC/DC converter turns on and off; accordingly, the output voltage of the second DC/DC converter is controlled at the third direct current (the state indicated by a dot line B in the FIG. 5).

As described above, Example 1 is arranged to avoid an abrupt voltage change of the output voltage of the second DC/DC converter during a transit (or a changeover) between the standby mode and the normal mode.

In this way, according to Example 1, the efficiency of the first and second DC/DC converters can be improved in the standby mode. In addition, Example 1 is capable of avoiding an abrupt voltage change of the output voltage during a changeover both from the standby mode to the normal mode and from the normal mode to the standby mode; this can suppress erroneous operation of circuits and the like.

Next, a power supply apparatus of Example 2 is described.

The power supply apparatus of Example 2 is based on an arrangement that is controlled—and that uses a control IC—such that switching frequency increases in a first DC/DC converter in the standby mode (i.e. in a low-load state) as in an RCC type or a frequency control type. Here, the RCC (Ringing Choke Converter) type converter refers to one of flyback converters in which switching operation occurs by self-oscillation.

Figure 2:
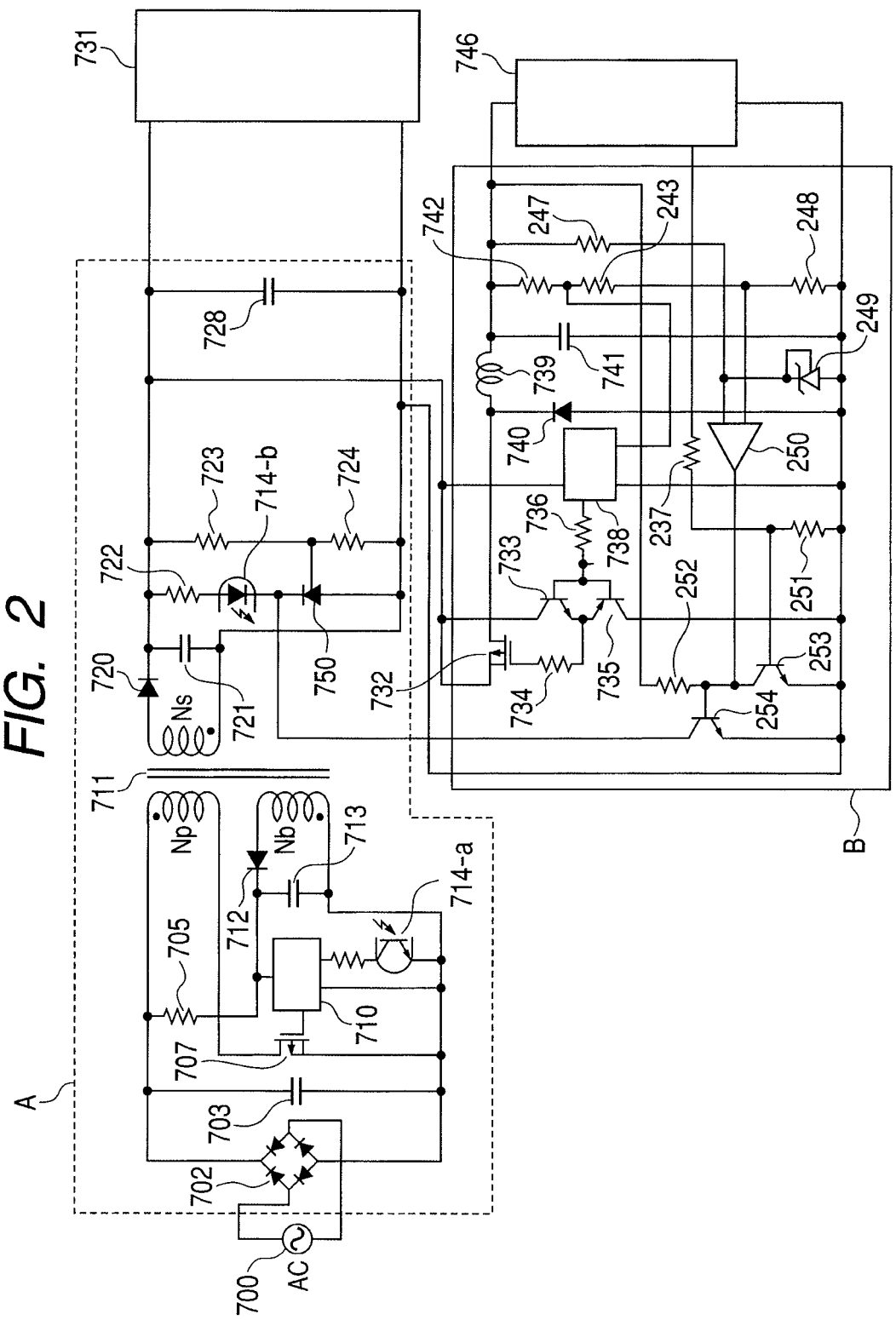
FIG. 2 is a circuit diagram illustrating an arrangement of a power supply apparatus of Example 2.

FIG. 2 is a circuit diagram of the power supply apparatus of Example 2. In the example, like reference characters are used to show duplicate parts in the arrangement of the prior art example, and description thereof is omitted. A first DC/DC converter A supplies a power supply voltage for the driving section and a second DC/DC converter B supplies a power supply voltage for the control section.

In FIG. 2, the apparatus includes resistors 742, 743, 747, 248, 237, 251 and 252, a comparator 250, a shunt regulator 249, and transistors 253 and 254.

In the normal mode, the CPU 746 turns on the transistor 253. Once the transistor 253 is turned on, the transistor 254 is then turned off; the first DC/DC converter, therefore, outputs the first direct current through the operation of the shunt regulator 750 regardless of the operation of the comparator 250. In the second DC/DC converter, the second DC/DC converter control IC 738 intermittently drives an FET 732 to output the second direct current.

When the appliance is brought into the standby mode and the CPU 746 turns off the transistor 253, the transistor 254 is operated with the output of the comparator 250. The output of the comparator 250 is electrically connected to the first DC/DC converter control IC 210 through the transistor 254 and a photocoupler 714, and the output of the first DC/DC converter causes the output voltage of the second DC/DC converter to reach the third direct current.

The output voltage of the second DC/DC converter is specified to reach the second direct current in the normal mode and the third direct current is set to be lower voltage than the second direct current; the output voltage of the first DC/DC converter, therefore, decreases from the first direct current to the third direct current.

Even though the input voltage decreases, the second DC/DC converter continues to operate while it increases ON duty of the FET 732 in order to maintain the output to the second direct current, and when the input voltage reaches the second direct current, the ON duty reaches 100% and the FET 732 is kept turned on. In addition, the comparator 250 does not operate to switch the FET 707 until the output voltage of the first DC/DC converter is reduced to the third direct current. As a result, the output voltage of the first DC/DC converter settles on the third direct current.

According to Example 2, the efficiency of the first and second DC/DC converters can be improved in the standby mode, as in Example 1.

Next, a power supply apparatus of Example 3 is described.

Examples 1 and 2 are based on using an IC that is capable of obtaining 100% ON duty as the second DC/DC converter control IC. Example 3 is based on an arrangement that uses an IC that is not capable of obtaining 100% ON duty as the second DC/DC converter control IC, and is characterized in that an external circuit for turning on an FET of the second DC/DC converter is provided.

In some cases, as a guard function for the control IC used for controlling the second DC/DC converter, there may be a duty guard function or a lower cut-off frequency for an oscillator (in this case, therefore, 100% ON duty cannot be set). Therefore, when the input voltage of the second DC/DC converter decreases, the FET of the second DC/DC converter cannot continue to be turned on. This causes a large variation of the output voltage or decrease in the output voltage, and operation as in Example 1 or 2 cannot be performed. In such a case, it is possible to provide an external circuit that detects the output voltage of the first DC/DC converter and turns on the FET of the second DC/DC converter when the detected voltage reaches a predetermined voltage, so that the FET of the second DC/DC converter can be placed in the ON state in the standby mode.

Figure 6:
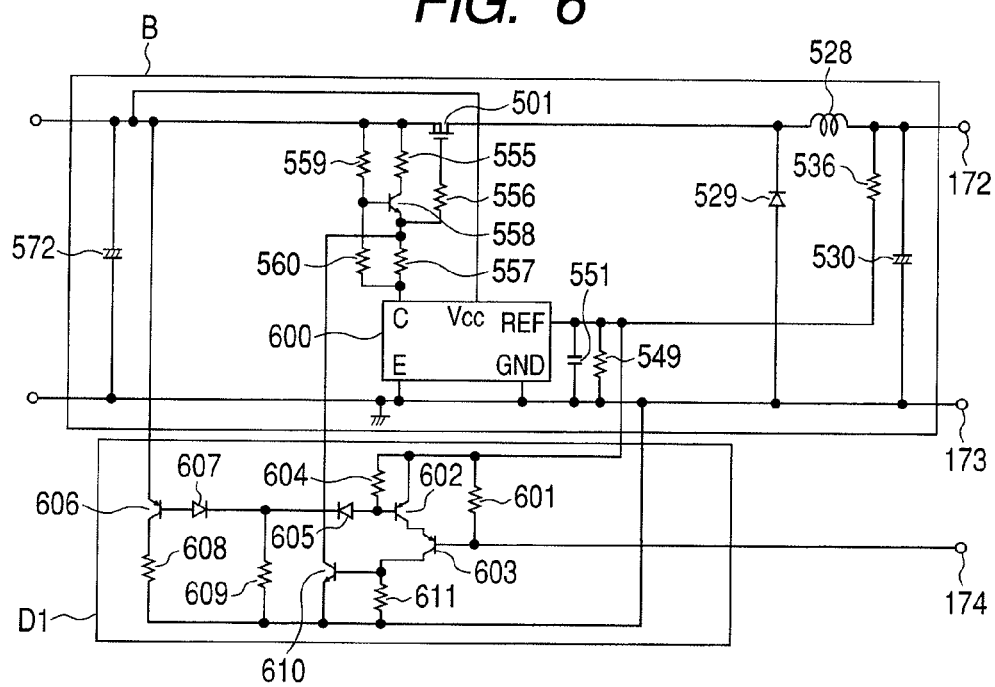
FIG. 6 is a circuit diagram illustrating an arrangement of a second DC/DC converter of Example 3.

FIG. 6 illustrates a specific exemplary circuit for this situation. This example is a power supply apparatus composed of the first DC/DC converter in Example 1 with the second DC/DC converter illustrated in FIG. 6 electrically connected thereto.

Here, a circuit for driving an FET 501 of a second DC/DC converter B illustrated in FIG. 6 is made up of a transistor 558, resistors 555, 556, 557, 559 and 560, and other components, and the rest of the circuit is made up of capacitors 551, 572 and 530, resistors 536 and 549, a diode 529, an inductor 528. Since the basic operation of the circuit is substantially the same as that described for the prior art arrangement, description thereof is omitted and only the arrangement and operation of an external circuit D1 of Example 3.

The external circuit D1 of the example is a circuit for turning on the FET 501 of the second DC/DC converter B in the standby mode. The apparatus includes a control IC 600 for the second DC/DC converter. The apparatus further includes a terminal REF used for inputting a control target voltage, a collector C and an emitter 501, and drives the FET 501 through a gate terminal of the FET 501 electrically connected to the end of the terminal C. A GND terminal for the control IC is indicated by GND.

The external circuit D1 is a circuit made up of resistors 601, 604, 608, 609 and 611, transistors 602, 603, 606 and 610, and diodes 605 and 607.

In the normal mode, the output voltage of the first DC/DC converter is at the first direct current, which is higher than the output voltage of the second DC/DC converter (second direct current). This causes the transistor 606 to turn on and a current to flow from the diode 607 through the resistor 609, which in turn reversely biases the diode 605, so that the transistor 602 does not operate. In addition, since both the transistors 603 and 610 are turned off, an intact, control output of the IC 600 is applied to the FET 501. Therefore, the second DC/DC converter, as controlled by the IC 600, continues to operate as a DC/DC converter.

When the appliance is brought into the standby mode, an unillustrated apparatus, or a load, brings the terminal 174 into a low state, and reduces the output voltage of the first DC/DC converter. Once the terminal 174 is in a low state and the output voltage of the first DC/DC converter decreases blow the second direct current, the transistors 602 and 603 turn on. This causes the transistor 610 to turn on and the FET 501 remains turned on to bring the gate of the FET 501 into a low state.

When the appliance is returned to the normal mode, the unillustrated appliance, or a load, restores the first DC/DC converter to output the normal mode output and brings the terminal 174 into a high, or high-impedance, state. The transistor 603 is then turned off, which also turns off the transistor 610 and again allows the IC 600 to drive the FET 501. At the same time, the output voltage of the first DC/DC converter starts to increase; accordingly, the IC 600 drives the FET 501 while progressively reducing ON time of the FET 501. The voltage variation observed during this period is only a variation seen immediately after the changeover from the standby mode to the normal mode due to the maximum duty range of the IC 600 and the increased voltage of the first DC/DC converter, which is within a fully acceptable range for a load apparatus. In this way, changeover can be performed with reduced variations of the voltage during the control changeover.

Figure 7:
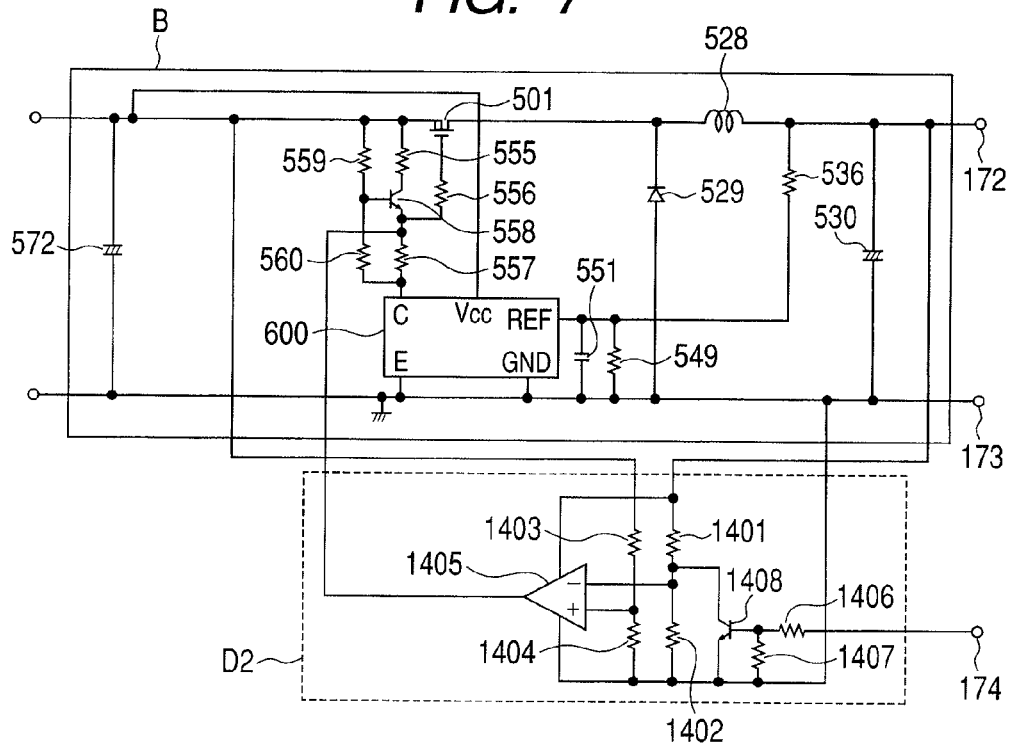
FIG. 7 is a circuit diagram illustrating another arrangement of the second DC/DC converter of Example 3.

FIG. 6 illustrates an example that uses discrete components. A comparator, however, may be used to construct a simpler circuit arrangement. FIG. 7 illustrates such a circuit.

In FIG. 7, the external circuit arrangement is different from that illustrated in FIG. 6. In an external circuit D2 illustrated in FIG. 7, the apparatus brings the terminal 174 into a high state in the normal mode. As the negative terminal of a comparator 1405 is brought into a low state, the comparator output terminal is brought into an OPEN state; the FET 501 is not affected. When the appliance is brought into the standby mode, the apparatus reduces the output voltage of the power supply apparatus and brings the terminal 174 into a low state. When the input voltage decrease and the negative terminal voltage of the comparator 1405 increases above the positive input terminal voltage, the comparator output is brought into a low state, causing the FET 501 of the second DC/DC converter to turn on.

In circuits illustrated in FIGS. 6 and 7 herein, the CPU 746, as a load of the control section, described in Examples 1 and 2 is electrically connected to the terminals 172, 173 and 174.

According to Example 3, even in a case where the IC is not capable of obtaining 100% ON duty as the second DC/DC converter control IC, the efficiency of the first and second DC/DC converters can be improved in the standby mode.

Next, a power supply apparatus of Example 4 is described.

Example 4 illustrates an exemplary case where the first DC/DC converter is composed of an RCC-type circuit. In this example, as the second DC/DC converter, a similar DC/CD converter is contemplated except a portion where the CPU 746 controls the transistor 127 in the second DC/DC converter B portion illustrated in FIG. 1. For the second DC/DC converter, therefore, description of Example 1 is referenced and further description is omitted here.

Figure 8:
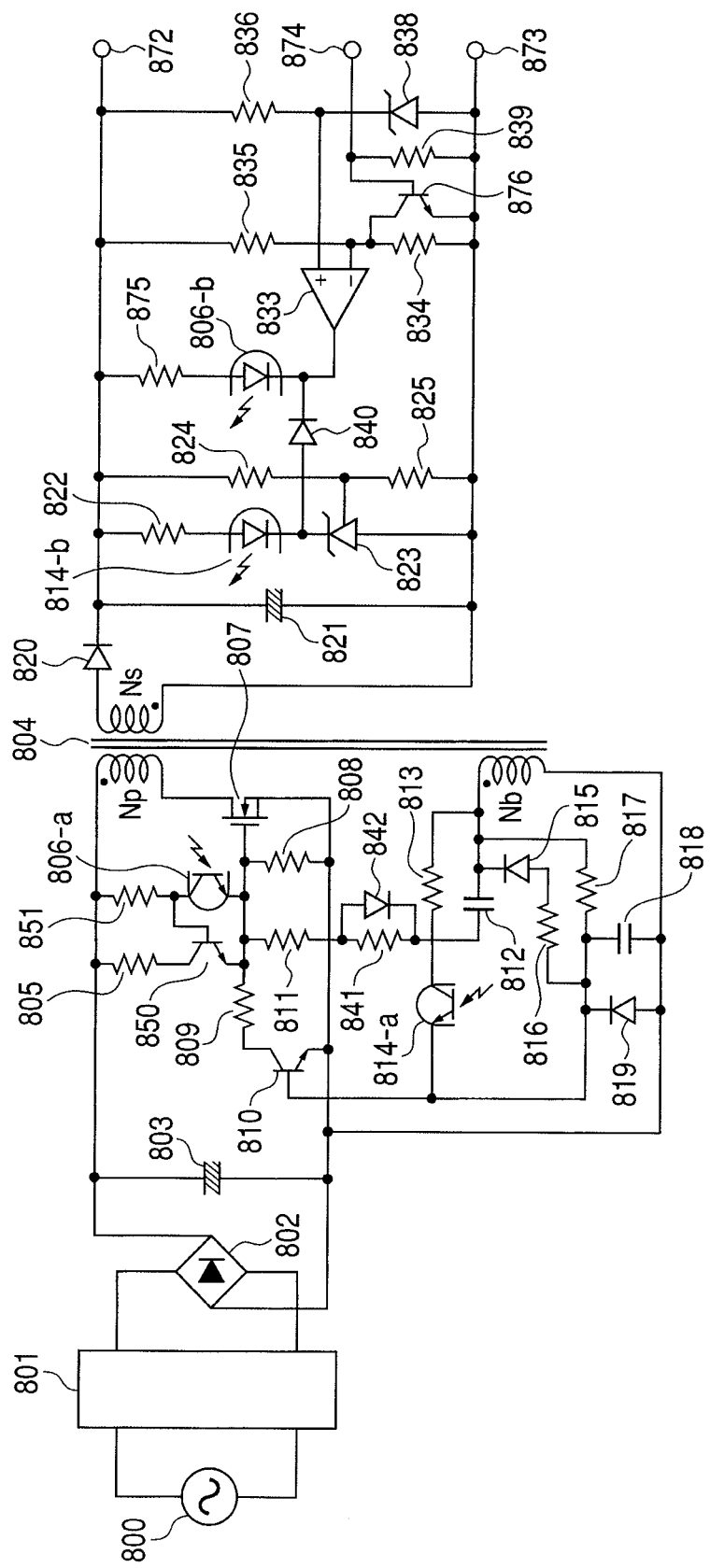
FIG. 8 is a circuit diagram illustrating an arrangement of a first DC/DC converter of a power supply apparatus of Example 4.

The operation of the first DC/DC converter according to this example is described below with reference to FIG. 8. In FIG. 8, the apparatus includes a commercial alternating voltage source 800, a filter circuit 801, a diode bridge 802, a capacitor 803 and a switching transformer 804. The apparatus further includes a start-up resistor 805, a phototransistor 806-*a* that is one end of a first photocoupler, a switching element 807, resistors 808, 809, 811, 813, 816 and 817, and a transistor 810. The apparatus further includes capacitors 812 and 818, a phototransistor 814-*a* that is one end of a second photocoupler, and diodes 815 and 819.

The apparatus further includes a secondary rectifying diode 820, an electrolytic capacitor 821, resistors 822, 824 and 825, and a shunt regulator 823. The apparatus further includes resistors 835, 836 and 839, a comparator 833, an LED 806-*b* of the photocoupler, a resistor 834, a comparator 833 and a transistor 876. The apparatus further includes a Zener diode 838 that generates a reference voltage.

When an AC power is applied to the diode bridge 802 through the filter circuit 801 from the commercial alternating voltage source 800, the current is subjected to the full-wave rectification and the capacitor 803 is then charged, which generates a DC voltage across the capacitor 803.

The operation in a case where the appliance is in the normal mode at the start-up is described. In the normal mode, a high signal is input to the terminal 874. This causes the transistor 876 to turn on and the LED 806-*b* of the photocoupler is not lit. Since the transistor 806-*a* of the photocoupler is in a high-impedance state, the resistor 851 causes a current to flow between the base and the emitter of the transistor 850 to turn on the transistor 850. As a result, a voltage, resulting from the division between the start-up resistor 805 and a resistor 808 electrically connected between the gate and the source of the switching element 807, is applied between the gate and the source to turn on the switching element 807. Once the switching element 807 is turned on, a current starts to flow through a primary winding Np of the transformer 804. In an auxiliary winding Nb of the transformer 804, a voltage is generated in the direction so as to further increase the gate voltage of the switching element 807. With this voltage, the capacitor 818 is charged through the resistor 817. Since the both-ends voltage of the capacitor 818 is also applied between the base and the emitter of the transistor 810, a sufficient base voltage is generated in the transistor 810 when a certain time has elapsed since the beginning of the charge, and the base voltage is allowed to flow to turn on the transistor 810.

Once the transistor 810 is turned on, the switching element 807 is turned off, and the drain-source voltage of the switching element 807 starts to increase. As a result, a voltage drops on the cathode side of the diode 815 on the auxiliary winding Nb, and a voltage is generated in the reverse direction.

In the secondary winding Ns, a current flows in the direction in which the diode 820 conducts the current, and when the voltage increases above the sum of a voltage of the capacitor 821 and a forward voltage, the capacitor 821 is charged. At the same time, the voltage appeared on the auxiliary winding Nb causes the capacitor 818 to discharge. The diode 819 is provided for protection to prevent a voltage from being applied above the base-emitter reverse withstanding voltage of the transistor 810. The resistor 816 and the diode 815 are provided for causing a current to flow in the direction so as to discharge the capacitor 818, so that the capacitor 818 is discharged faster than it is discharged through the resistor 817. In this state, the transistor 810 is turned off; the gate voltage of the switching element 807 thereafter depends upon a current supplied from the start-up resistor 805 and a current supplied through the resistor 811 and the capacitor 812 and flowing into the auxiliary winding Nb. The resistor 841 and the diode 842 are provided for accelerating turning off of the switching element 807.

While the switching element 807 is kept turned off, the energy accumulated in the transformer 804 is transferred to the capacitor 821; the voltage of the winding Ns, therefore, decreases over time. Since the voltage of the winding Ns is reflected on the output voltage of the auxiliary winding Nb, the voltage on the anode side of the diode 819 of the winding Nb also decreases. Biased by a current flowed in from the start-up resistor 805, the gate voltage of the switching element 807 increases.

When the gate voltage of the switching element 807 exceeds a threshold, the switching element 807 turns on, and a current flows in the direction from the capacitor 803 to the winding Np through the transformer 804, and then through the switching element 807 to the negative terminal of the capacitor 803. In addition, since in the winding Nb a current flows in the direction from the winding Nb to the capacitor 812 to the resistor 811 to the resistor 808 back to the winding Nb, the gate voltage of the switching element 807 further increases. In this way, the capacitor 818 is charged by the voltage of the winding Nb and the resistor 817 as described above; turning on the transistor 810 causes the switching element 807 to turn off.

Continuing a series of oscillating operation as described above, the energy, which is accumulated in the transformer 804 during ON period of the switching element 807, is accumulated in the capacitor 821 during OFF period of the switching element 807, and the both-ends voltage of the capacitor 821 then increase.

The voltage of the capacitor 821 is divided by the resistors 824 and 825, and when the both-ends voltage of the resistor 825 exceeds the reference voltage in the shunt regulator 823, the shunt regulator 823 starts the current flow between the cathode and the anode, which causes the photodiode 814-*b* of the photocoupler to emit light.

The transistor 814-*a* on the light-receiving side of the photocoupler is electrically connected to the resistor 813 and the base of the transistor 810, and when the LED of the photocoupler 814 emits light, the impedance of the phototransistor 814-*a* decreases. This turns on the transistor 810 and turns off the switching element 807. In this way, the both-ends voltage of the capacitor 821 is controlled such that the both-ends voltage of the resistor 825 matches the reference voltage.

In the standby mode, the terminal 874 is in a low state. When the terminal 874 is in a low state, the transistor 875 turns off. This enables the output signal of the comparator 833 to be used to control the light emission of the photodiode 106-*b* of the photocoupler.

The comparator 833 receives, at the negative input terminal, the output voltage divided by the resistors 835 and 834. At the positive input terminal, the comparator 833 receives the reference voltage of the Zener diode 838 biased by the resistor 836. The comparator 833 compares the input voltage to the reference voltage, and if the voltage of the resistor 834 is higher than that of the Zener diode 838, the comparator 833 switches its output terminal to low. Once the output terminal of the comparator 833 is switched to low, the photodiode 806-*b* of the photocoupler emits light. This reduces the impedance of the transistor 806-*a* of the photocoupler to turn off the transistor 850. Since the resistor 851 has a higher resistance than the start-up resistor 805, the gate voltage at the start-up decreases so that the switching element 807 cannot turn on. Since the resistor 851 has a high resistance, two or more resistors are electrically connected in series. The start-up resistor 805 has a similar structure. This situation may allow the switching element 807 to turn on because of the voltage of the winding Nb. Therefore, an arrangement may be provided, which uses the output of the comparator 833 to also emit the LED 834-*b* of the photocoupler to reduce the impedance of the transistor 814-*a* of the photocoupler, so that the switching element 807 can reliably be turned off.

Once the switching element 807 turns off, the output voltage of the first DC/DC converter, which is a voltage between the terminals 872 and 873, decreases. When the value of the output voltage of the first DC/DC converter divided by the resistors 835 and 834 decreases below the voltage of the Zener diode 838, the comparator 833 turns off and the LEDs 806-*b* and 814-*b* of the photocouplers are extinguished. (At this point, the output voltage is the third direct current as described in Example 1.) As a result, the impedance of the transistor 850 decreases and the start-up current starts to flow. In addition, the impedance of the transistor 810 increases and the gate terminal voltage of the switching element 807 is allowed to increase.

The segment between the cathode and the anode of the shunt regulator 823, which is used for voltage feedback and which is operated when the first DC/DC converter is in the normal mode, is in a high-impedance state because the output voltage of the first DC/DC converter is reduced. Therefore, the LED 814-*b* of the photocoupler does not emit light.

The switching element 807 is, therefore, driven in the maximum ON time as it does at the start-up of the power supply.

Remember that Example 1 is an arrangement in which the division ratio of resistors input to the shunt regulator is switched between the standby mode and the normal mode. If, however, the arrangement is similarly reconstructed in the RCC type, the frequency in the standby mode raises to a much higher frequency. As a result, the switching loss may increase and degrade, instead of improving, the efficiency.

If the first DC/DC converter is constructed in an RCC circuit, an arrangement as in Example 4 can also reduce losses due to the start-up resistor because, under a low voltage output condition in the standby mode, the transistor 850 electrically connected to the start-up resistor is switched. Therefore, the efficiency of the power supply apparatus can further be improved.

Next, Example 5 is described. In Example 5, description is made to a case where the RCC-type power supply apparatus described in Example 4 is applied to a laser beam printer. Common parts to Example 4 are shown using like reference characters, description thereof is omitted, and only features specific to this example are described.

The operation of the first DC/DC converter in this example is described.

Figure 9:
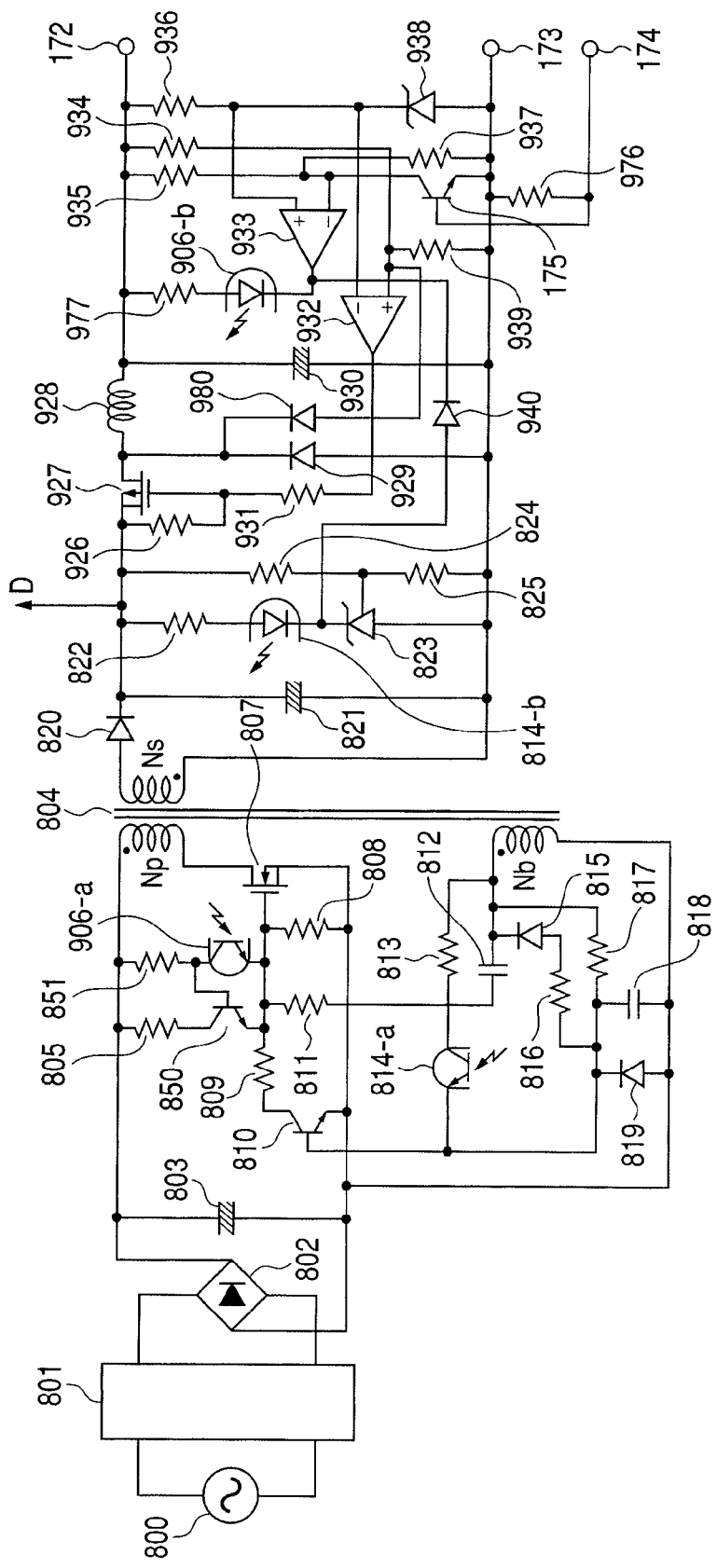
FIG. 9 is a circuit diagram illustrating an arrangement of a power supply apparatus of Example 5.

FIG. 9 is a circuit diagram illustrating an arrangement of the first DC/DC converter and the second DC/DC converter in the laser beam printer of this example. In FIG. 9, the left side to an FET 927 is the first DC/DC converter portion and the right side including the FET 927 is the second DC/DC converter portion. The output (+24 V) from the first DC/DC converter is supplied to a driving part, such as a motor, in the image forming apparatus. The output (+3.3 V) from the second DC/DC converter is supplied to a control part, such as a CPU and an ASIC, which controls the operation of the driving part in the image forming apparatus.

In FIG. 9, the arrangement includes a main switching FET 927 of the second DC/DC converter, an inductor 928, a regenerative diode 929, a capacitor 930, resistors 926 and 934 to 937, and a Zener diode 938. The arrangement further includes a resistor 939 and comparators 932 and 933.

First, the operation in the normal mode is described. Using the voltage of the Zener diode 938 as a reference voltage, the comparator 932 compares the reference voltage to a voltage divided by the resistors 934 and 939. When the voltage of the resistor 939 decreases below the voltage of the Zener diode 938, the output of the comparator 932 is switched to low; the gate voltage of the FET 927, therefore, decreases to turn on the FET 927. This causes a current to flow through the inductor 928, the capacitor 930 is charged and the both-ends voltage of the capacitor increases. The voltage then increases, and when the voltage of the resistor 939 exceeds the voltage of the Zener diode 938, the output of the comparator 932 is switched to high; the gate voltage of the FET 927, therefore, increases to turn off the FET 927. Since the inductor 928 attempts to further continue the current flow, the diode 929 is turned on to charge the capacitor 930 with energy accumulated in the inductor 928. At this point, since the diode 980 conducts the current to reduce the voltage at the positive input terminal of the comparator 932, the comparator 932 is inverted to turn on the FET 927. Repeating a series of oscillating operation as described above, the illustrated first DC/DC converter continues to oscillate.

Figure 10:
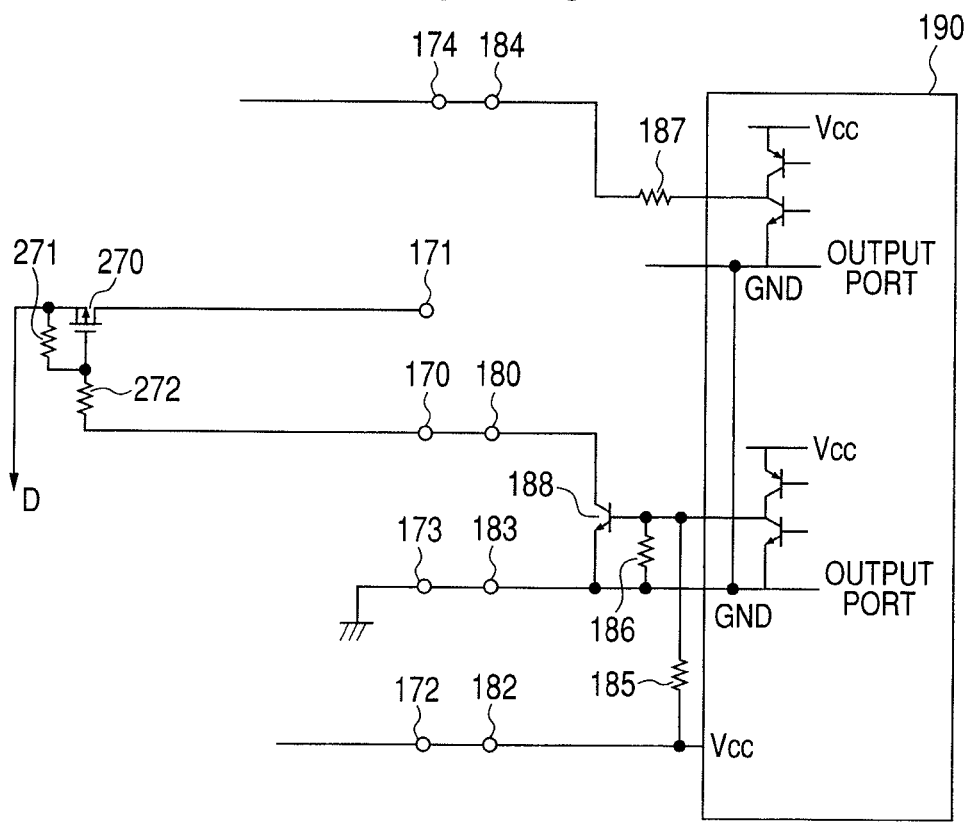
FIG. 10 is a diagram illustrating connections from a control part of a laser printer to the power supply apparatus of Example 5.

FIG. 10 illustrates connections of an energy-saving mode signal line from the control part of the laser printer to the power supply apparatus. FIG. 10 illustrates an output transistor 188 of the control circuit and a control circuit 190 made up of a CPU or an ASIC. FIG. 10 further illustrates resistors 185 to 187, 271 and 272. The output of the driving section (+24 V) is turned on and off through a load switch using an FET 270. The drain of the FET 270 is electrically connected to an end D in FIG. 9, i.e. the driving section power supply. With this arrangement, when the output of the control circuit 190 is high, the output transistor 188 is in a low-impedance state and the load switch, i.e. the FET 270, is turned on. On the other hand, when the output of the control circuit 190 is low, the output transistor 188 is in a high-impedance state and the load switch, i.e. the FET 270, is turned off.

Figure 11:
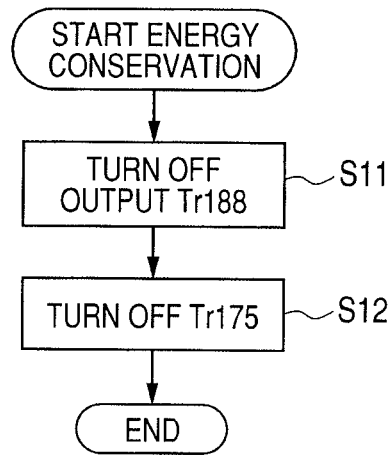
FIG. 11 is a flow chart illustrating the operation of Example 5 when transit is made to an energy-saving mode.

The operation when the appliance is brought into the energy-saving mode is described with reference to a flow chart in FIG. 11. In energy-saving mode, in step 11 (abbreviated to S11 in FIG. 11, the same applies below), a signal from the control circuit 190 causes the output transistor 188 to turn off to bring the gate terminal receiving from the resistor 272 into a high state or a high-impedance state in order to stop supplying the first direct current. Under the condition, since the FET 270, the load switch, is turned off, the first DC/DC converter does not output the first direct current from the terminal 171 outside the power supply.

Thereafter, in step 12, when the terminal 184 is switched to low and the energy-saving mode signal is input from the terminal 174 to the power supply apparatus illustrated in FIG. 9, the transistor 175 turns off, allowing the current to flow through an LED 906-b of the photocoupler, which enables the comparator 933 of the power supply to operate. The comparator 933 is arranged to compare a voltage divided by the resistors 935 and 937 to the voltage of the Zener diode 938. The comparator 933 is brought into the ON state when the voltage of the resistor 937 is higher than the voltage of the Zener diode 938, which causes a current to flow through the LED 906-b of the photocoupler to light the LED. A transistor 906-a on the receiving side of the photocoupler 906 is electrically connected between the base and the emitter of the transistor 850, and causes the transistor 850 to turn off when the LED of the photocoupler 906 emits light and causes the transistor 850 to turn on when the LED is extinguished. In this way, the start-up resistor 805 and the switching element 807 are turned on and off such that the output voltage of the second DC/DC converter settles on the third direct current. The feedback circuit of the second DC/DC converter, therefore, operates to keep the FET 927 turned on because the value of the output voltage is continuously below a target value. In this way, with the FET 927 of the second DC/DC converter being held in the ON state, a switching loss is suppressed and the loss in the second DC/DC converter is limited only to that attributable to the resistance of the FET 927 and the inductor 928. In addition, since the first DC/DC converter will have long-cycled halts in response to the increase and decrease of the voltage of 3.3 V, the switching loss is reduced and the power supply efficiency is greatly improved.

Figure 12:
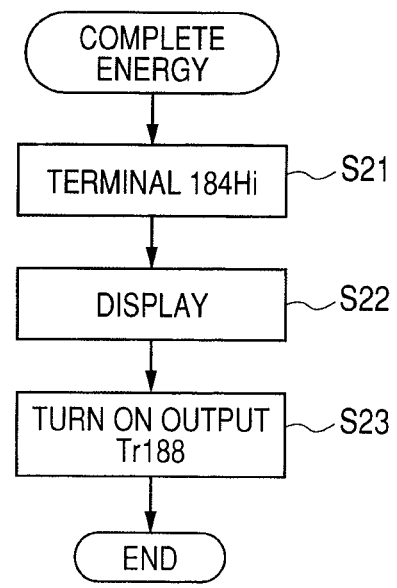
FIG. 12 is a flow chart illustrating the operation of Example 5 at the time of returning from the energy-saving mode.

Next, recovery from the energy-saving mode is described with reference to FIG. 12. Switching the terminal 184 to high in step 21 causes the transistor 175 to turn on, the comparator 933 to stop controlling the start-up resistor 805 and the FET 907, and the output voltage of the first DC/DC converter to start to increase toward the first direct current (+24 V). After waiting for the output voltage of the first DC/DC converter to reach the first direct current for some microsecond in step 22, the output transistor 188 is turned on in step 23. The FET 270, the load switch, is then turned on to supply the first direct current from the terminal 171 to the load of the driving section. Alternatively, if there is no such an element that erroneously operates when an unreliable voltage is applied in the load of the driving section, the FET 270, the load switch, may be eliminated such that the first direct current is not turned on or off.

As described above, according to this example, the efficiency of the power supply apparatus in the standby mode can be improved in an arrangement in which the power supply apparatus of the invention is applied to a laser beam printer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-318322, filed on Dec. 15, 2008, which is hereby incorporated by reference herein in its entirety.

What is claimed is:

1. A power supply apparatus for converting an alternating voltage source to a direct current voltage, comprising:
 a rectification smoothing unit for rectifying and smoothing the alternating current voltage;
 a first DC/DC converter for converting a voltage rectified and smoothed by said rectification smoothing unit and outputting a first direct current voltage; and
 a second DC/DC converter for outputting a second direct current voltage lower than the first direct current voltage by switching the first direct current by a switching unit,
 wherein the switching unit of said second DC/DC converter comes into a continuously-conducting state by reducing the first direct current voltage of said first DC/DC converter.

2. A power supply apparatus according to claim 1, wherein the continuously-conducting state of the switching unit is achieved when the first direct current voltage becomes a direct current voltage equal to or less than the second direct current voltage.

3. A power supply apparatus according to claim 2, comprising a feedback unit for detecting an output voltage of the first DC/DC converter,
 wherein an output voltage of said first DC/DC converter is reduced from the first direct current voltage to a direct current voltage equal to or less than the second direct current voltage by switching a reference voltage of said feedback unit.

4. A power supply apparatus according to claim 1, wherein said power supply apparatus controls an operation of the switching unit of the first DC/DC converter so that an output voltage of said second DC/DC converter becomes a voltage equal to or less than the second direct current voltage.

5. A power supply apparatus according to claim 2, wherein said first DC/DC converter has a start-up resistor that drives a switching unit when said power supply apparatus is activated, wherein an output voltage of said first DC/DC converter reduces a direct current voltage equal to or less than the second direct current voltage by switching a resistance value of the start-up resistor.

6. A power supply apparatus according to claim 1, comprising a switch to supply or stop supplying the first direct current voltage from said first DC/DC converter to a load,
 wherein an output voltage of said first DC/DC converter is reduced after the switch is turned off to stop supplying the first direct current to the load.

7. A power supply apparatus according to claim 1, comprising a switch to supply or stop supplying the first direct current voltage from said first DC/DC converter to a load,
   wherein in a case where the switch is turned on, after an output voltage of said first DC/DC converter is recovered to the first direct current voltage from a voltage below the first direct current voltage, the switch is turned on.

8. An image forming apparatus comprising:
   a plurality of loads each of which operates for forming an image;
   a power supply apparatus that converts an alternative current voltage to a direct current voltage and supplies a converted direct current voltage to said plurality of loads,
   wherein said power supply apparatus includes:
   a rectification smoothing unit for rectifying and smoothing the alternating current voltage;
   a first DC/DC converter for converting a voltage rectified and smoothed by said rectification smoothing unit and outputting a first direct current voltage to a first load among said plurality of loads; and
   a second DC/DC converter for outputting a second direct current voltage lower than the first direct current voltage to a second load among said plurality of loads by switching the first direct current by a switching unit,
   wherein the switching unit of said second DC/DC converter comes into a continuously-conducting state by reducing the first direct current voltage of said first DC/DC converter.

9. An image forming apparatus according to claim 8,
   wherein said image forming apparatus is transitable to a power-saving condition in which a supply of the first direct current voltage to the first load is stopped and a voltage supply to the second load is continued,
   wherein in the power-saving condition of said image forming apparatus, the continuously-conducting state of the switching unit is achieved when the first direct current voltage becomes a direct current voltage equal to or less than the second direct current voltage.

10. An image forming apparatus according to claim 9, comprising a feedback unit for detecting an output voltage of the first DC/DC converter,
   wherein in the power-saving condition of said image forming apparatus, an output voltage of said first DC/DC converter is reduced from the first direct current voltage to a direct current voltage equal to or less than the second direct current voltage by switching a reference voltage of said feedback unit.

11. An image forming apparatus according to claim 9,
   wherein in the power-saving condition of said image forming apparatus, said power supply apparatus controls a switching operation of the first DC/DC converter so that an output voltage of said second DC/DC converter becomes a voltage equal to or less than the second direct current voltage.

12. An image forming apparatus according to claim 9,
   wherein said first DC/DC converter has a start-up resistor that starts a switching operation of said first DC/DC converter when said power supply apparatus is activated,
   wherein in the power-saving condition of said image forming apparatus, an output voltage of said first DC/DC converter reduces a direct current voltage equal to or less than the second direct current voltage by switching a resistance value of the start-up resistor.

13. An image forming apparatus according to claim 9, comprising a switch to supply or stop supplying the first direct current voltage from said first DC/DC converter to the first load,
   wherein in the power-saving condition of said image forming apparatus, an output voltage of said first DC/DC converter is reduced after the switch is turned off to stop supplying the first direct current to the load.

14. An image forming apparatus according to claim 9, comprising a switch to supply or stop supplying the first direct current voltage from said first DC/DC converter to a load,
   wherein said image forming apparatus shifts a condition to a normal operation condition from the power-saving condition, after an output voltage of said first DC/DC converter is recovered to the first direct current voltage from a voltage below the first direct current voltage, the switch is turned on.

15. An image forming apparatus according to claim 8, comprising
   wherein the first load is a drive unit that is driven for forming an image;
   wherein the second load is a control unit that controls said image forming apparatus;
   wherein in a condition where a voltage supply to the drive unit is stopped and a voltage supply to the control unit is continued, the switching unit is in the continuously-conducting state.

* * * * *